United States Patent
Remillard

(10) Patent No.: US 8,582,824 B2
(45) Date of Patent: Nov. 12, 2013

(54) CELL FEATURE EXTRACTION AND LABELING THEREOF

(75) Inventor: Jason Remillard, Groton, MA (US)

(73) Assignee: Twin Coast Metrology, Groton, MA (US)

(*) Notice: Subject to any disclaimer, the term of this patent is extended or adjusted under 35 U.S.C. 154(b) by 1175 days.

(21) Appl. No.: 12/491,669

(22) Filed: Jun. 25, 2009

(65) Prior Publication Data
US 2010/0329538 A1 Dec. 30, 2010

(51) Int. Cl.
*G06K 9/00* (2006.01)
*H04N 5/225* (2006.01)

(52) U.S. Cl.
USPC ........................................ 382/108; 348/207.1

(58) Field of Classification Search
None
See application file for complete search history.

(56) References Cited

U.S. PATENT DOCUMENTS

| | | | |
|---|---|---|---|
| 4,575,248 A | 3/1986 | Horwitz et al. | |
| 5,260,556 A | 11/1993 | Lake et al. | |
| 5,579,455 A * | 11/1996 | Greene et al. | 345/422 |
| 7,398,928 B2 | 7/2008 | Gaspard et al. | |
| 7,957,061 B1 * | 6/2011 | Connor | 359/463 |
| 2004/0008259 A1 * | 1/2004 | Gokturk et al. | 348/207.1 |
| 2008/0157283 A1 * | 7/2008 | Moslehi | 257/618 |
| 2008/0169586 A1 * | 7/2008 | Hull et al. | 264/401 |

OTHER PUBLICATIONS

Breuckmann precision in 3D, Retrieved May 12, 2010 Available at: http://www.breuckmann.com/en/company/company.html.
Epipolar geometry, Retrieved on Jun. 22, 2009 Available at: http://en.wikipedia.org/wiki/Epipolar_geometry.
Geodetic Systems. Inc. 3D Industrial Measurement Systems, Retrieved on May 12, 2010 Available at: http://www.geodetic.com/products/.
GOM—Measuring Systems—ATOS, Retrieved on May 12, 2010 Available at: http://www.gom.com/EN/measuring.systems/atos/system/system.html.
PhotoModeler—accurate and affordable 3D photogrammetry measurement and scanning, 2010 Eos Systems Inc., Retrieved on May 12, 2010 Available at: http://www.photomodeler.com/index.html.
Steinbichler Optotechnik—Competence in Optical Measuring and Sensor Technology, Retrieved on May 12, 2010 Available at: http://www.steinbichler.de/.
Gorman, L. O. et al., "Locally Adaptive Techniques", Practical algorithms for image analysis, Section 3.9.2, 2008, p. 115.
Gutierezz, J. A. et al., "Model-Based Landmark Location Estimators", Precision Landmark Location for Machine Vision and Photogrammetry, Chapter 4, 2008, pp. 57-63.
Hartley, R. et al., "Epipolar Geometry and Fundamental Matrix", Multiple-View Geometry in Computer,Section 9.1, Chapter 12, Chapter 18.1, appendix 6, section 6.1, section 6.2, and section 7.4, 2003, 37 pages.
Michalewicz, Z. et al., "Simulated annealing", How to Solve It: Modern Heuristics, Section 5.1, 2004 , pp. 117-125.
Russ, John C., "Segmantation and Thresholding", The image processing handbook, 2007 , pp. 435-439.

* cited by examiner

*Primary Examiner* — Ryan Zeender
*Assistant Examiner* — Dana Amsdell
(74) *Attorney, Agent, or Firm* — Robert Plotkin, P.C.

(57) ABSTRACT

Embodiments of the present invention determine the surface profile of certain classes of work surface. More specifically, embodiments of the invention measure the three-dimensional locus of points that define the "virtual" continuous surface fitted to the ends of the walls of a cellular core.

11 Claims, 9 Drawing Sheets

CELL FEATURE EXTRACTION AND LABELING THEREOF

BACKGROUND OF THE INVENTION

The present invention relates to the field of non-contact surface metrology. During many manufacturing operations it is important to measure the surface profile of a work piece. Over time, the accuracy and spatial resolution requirements of the surface profile have increased while at the same time the characteristics of the surface to be profiled have become more challenging to measure using conventional profiling technologies.

Historically, surface profiles were coarsely sampled with accuracies of 0.1 to 1.0 thousandths of an inch using dial indicators. Later, and to the present day, co-ordinate measuring machines (CMMs) replaced dial indicators but CMMs remain, essentially, highly accurate, point probe devices. That is, measurements are defined by scanning over the x-y surface with a probe attached to a third moving axis of the machine. Probes may be mechanical, optical, laser, or white light, among others.

A number of image-based metrology systems have been developed to overcome the inherent slowness of CMMs when used to measure large surface areas with high spatial sampling density. Perhaps the first image-based metrology technology was photogrammetry which was used for mapping purposes reportedly as early as the 1850's. For the purposes of this specification photogrammetry is the measurement of a surface profile by triangulation of a point's three-dimensional coordinates from two (or more) non-redundant images of the surface. Photogrammetric metrology systems have become popular as digital cameras and inexpensive computers have become commonplace. One difficulty encountered in using a photogrammetry system is identifying the pairs of image points (in the two images) on which to triangulate. Typically in industrial applications, where often the surface is relatively featureless, easily identifiable targets are placed on the work surface and triangulation is applied to these sparse targets.

A second image-based metrology system is based on "structured light" projection (SLP). SLP systems are a subset of photogrammetry that were developed to overcome the difficulty of identifying pairs of measurement points in both photogrammetry images. In effect, the "structured light" that is projected onto the work surface replaces the physical targets in more traditional photogrammetry systems.

Many different light patterns can be used in SLP systems. A pattern of small light spots is a simple example. If the spots are sufficiently spread out, or are uniquely shaped, then the system can uniquely identify a given spot in each of the two images. With the same spot identified in each image, triangulation can be accurately performed.

More typically in modern SLP systems the light pattern comprises one-dimensional sinusoidal fringes or binary stripes. Using a well-known phase shifting technology the SLP system assigns a sine phase to each point in each image—the phase for a given point on the surface is the same in each image. The SLP system then triangulates phase-matched points in each image.

Neither traditional photogrammetry systems nor SLP systems can operate successfully on certain classes of work surfaces. For example, many lightweight structures are fabricated as a laminated sandwich comprising smooth outer skins enclosing a cellular core. For high performance applications the face of the cellular core is machined to tight tolerances but neither existing technologies, as currently implemented, can measure the "virtual" surface formed by the ends of the machined walls of the cells with adequate accuracy or spatial resolution.

BRIEF SUMMARY OF THE INVENTION

Embodiments of the present invention are directed to apparatuses and methods for determining the surface profile of certain classes of work surface. In more specificity, the various embodiments of the invention provide an apparatus for and a method of measuring the three-dimensional locus of points that define the "virtual" continuous surface fitted to the ends of the walls of a cellular core. That is, embodiments of the invention are cellular core profilers.

The embodiments are forms of photogrammetry in which measurements are made at each of the cells (possibly numbering in the tens of thousands or more) that make up a cellular laminate core. Typically a photogrammetry system apparatus comprises a digital image projector, two digital cameras, and a processor in which two, 2-dimensional representations of the 3-dimensional surface are transformed into a 3-dimensional representation of the original surface.

As in all photogrammetry systems, two (or more) images ("left" and "right") of the work surface are captured for post-processing. In one embodiment of the invention two cameras are used in parallel to capture two images, although it is well known in the art that the two or more images may be captured sequentially by a single camera that is displaced between image captures, as is done in aerial mapping. These two images are formed using substantially uniform illumination. A digital image projector is a convenient means for generating the substantially uniform illumination pattern.

Furthermore, in one embodiment of a cellular core profiler one or more additional images are captured in the two cameras using so-called "structured light". "Structured light" is intentionally non-uniform illumination wherein the non-uniformity of the illumination is used to generate labels for the corresponding surface locations in the images in the two cameras. A digital image projector is a convenient means for generating the structured light pattern.

The work surface for a cellular core profiler comprises the open ends of a cellular core structure. Typically the cellular core structure is formed from nominally hexagonal cells, viz., a "honeycomb" structure, although other cell shapes or mixtures of cell shapes may be used. In all cases of interest the work surface is not a continuous sheet but the desired measurement is of the substantially continuous virtual surface that is defined by the ends of the walls of the cells. A cellular core profiler generally produces a surface map that is a discrete representation of that continuous, virtual surface.

The various embodiments of this invention comprise multiple process steps that transform the inherently two-dimensional images captured by the cameras into a three-dimensional representation of the physical cellular core surface. In some embodiments these steps comprise identifying the walls that make up the individual cells, finding the junctions of those walls, optimizing the estimated locations of those junctions, and calculating a single co-ordinate pair representative of the location, in the image plane, of the image of each cell. In some embodiments these steps further comprise calculating a label for each cell, said label may be the average phase of a set of structured light measurements made along the walls of each cell and additionally comprise the step of associating the labels with the co-ordinate pairs representative of the locations of all the cells in a cellular core image.

In some embodiments the various images may be combined using epipolar geometry to estimate the height of each cell, as represented by the single co-ordinate pair, by triangulation. In other embodiments the estimation process is improved using so-called "bundle adjustment" techniques. In other embodiments, bundle adjustment techniques may be applied to a subset of the cells, with the improved estimation parameters subsequently applied to the full set of cells, thereby reducing the computational load on the processor.

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE SEVERAL VIEWS OF THE DRAWING

The foregoing and other objects, features and advantages of the invention will become apparent from the following description in conjunction with the accompanying drawings, in which reference characters refer to the same parts throughout the different views. The drawings are not necessarily to scale; emphasis has instead been placed upon illustrating the principles of the invention. Of the drawings.

DETAILED DESCRIPTION OF THE INVENTION

Definitions a. Cell—a single unit of structural material defined by three or more walls of the material, which may or may not have end caps. A single hexagon of wax in a honeycomb is an example of a cell.

b. Center of a cell—the centroid of the region defined by a cross-section of the walls of a cell.

c. Cellular Core—a structural material formed from an array of cells, wherein adjacent cells generally share a common wall. A honeycomb is an example of a cellular core.

d. Cell Junction—the intersection of two or more of the walls in a cellular core. Also, one of the vertices of a cell.

e. Cell graph—a representation of the cellular core formed by connecting the cell junctions with straight line segments.

f. Surface Map, Surface Profile—A discrete set of three-dimensional points that represent a substantially continuous surface.

g. Surface of a Cellular Core—A virtual continuous surface defined by the ends of the walls of the cells.

Figure 1:
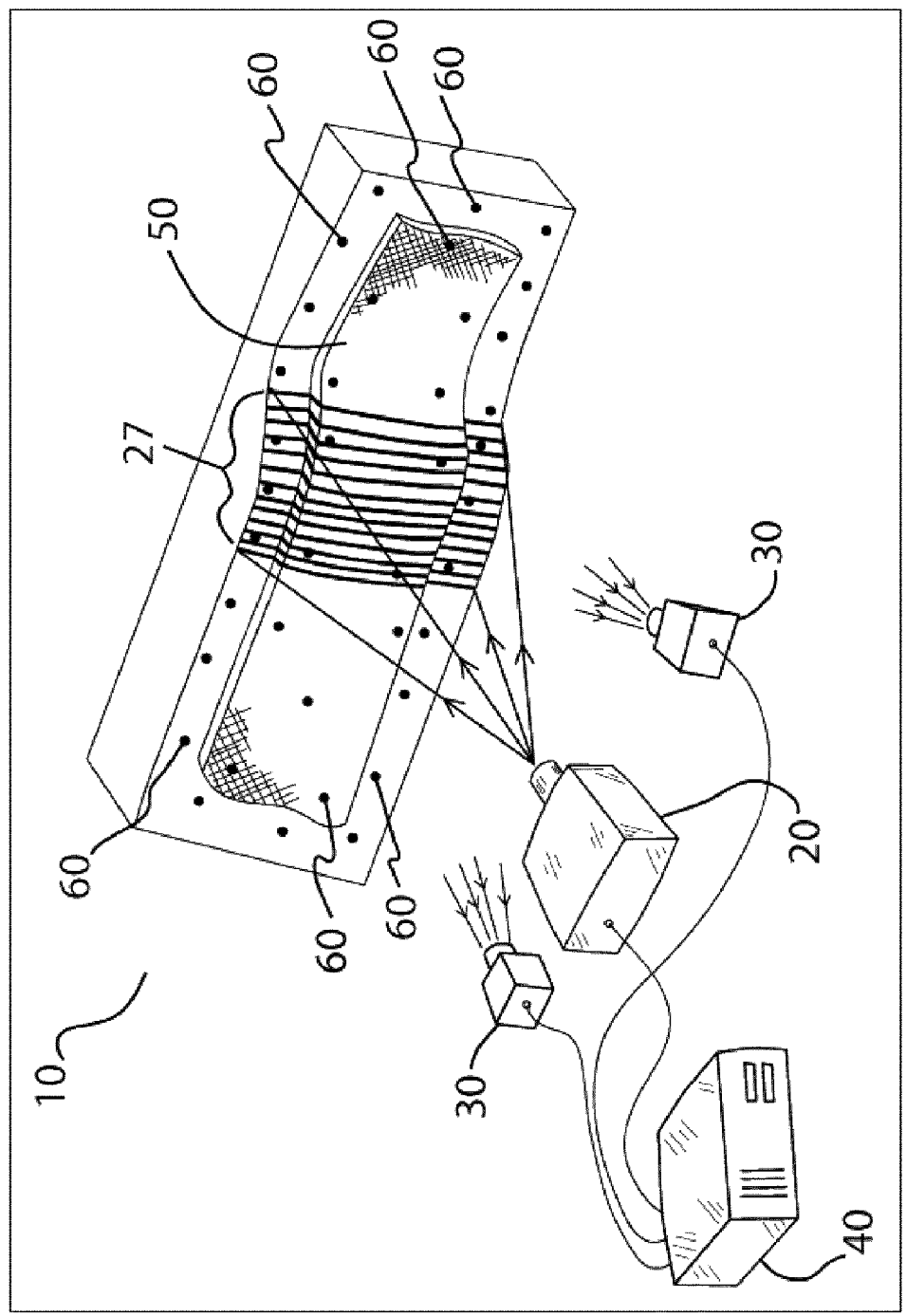
FIG. 1 is a schematic diagram of the cellular core profiling system according to one embodiment of the present invention.

FIG. 1 illustrates a schematic diagram of a cellular core profiling system 10 comprising an apparatus to collect data representing a cellular core work surface 50, a processor in which said data is transformed, and the several processes to extract cell features and to label individual cells for photogrammetric transformation. One embodiment of the system comprises a digital image projector 20, two digital cameras 30, and an electronic digital processor 40 in which images of a work surface 50 recorded by the two digital cameras are transformed into a three dimensional surface map or profile of cellular core work surface 50.

Figure 2:
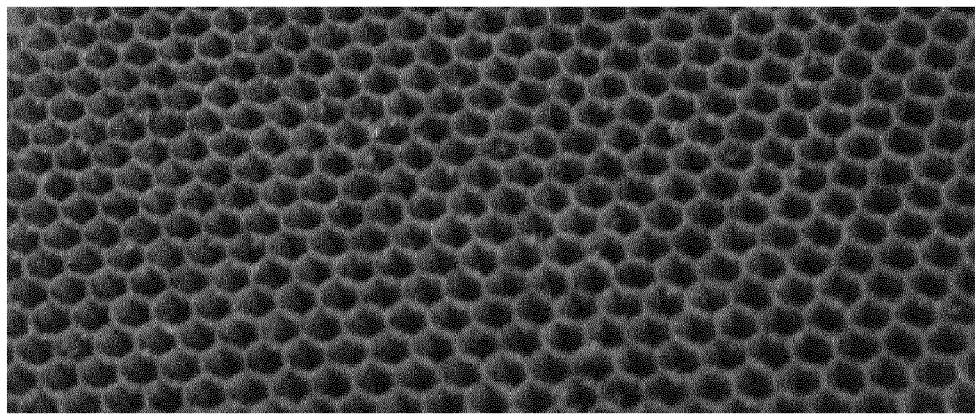
FIG. 2 is an illustration of an exemplary hexagonal cellular core.

An example of a cellular core work surface is illustrated in FIG. 2. The cellular core in the image exhibits some of the typical flaws that occur in photogrammetric images. In some industrial operations it is desirable to measure the three dimensional surface of the cellular core. In some instances it is desirable to measure the surface with a resolution on the order of the individual cells. As will be described below, in one embodiment of the apparatus and method between 8 and 35 pixels are used across each individual cell. With conveniently available digital cameras 30, data for 15,000 to 20,000 cells may be acquired in a single image field. As suggested in FIG. 1, it may take multiple images to record the entire work surface. When multiple images are required to record the entire work surface, a stitching process, such as any of a variety of conventional stitching processes, may be used to combine the individual surface maps. A plethora of conventional stereo photogrammetry targets 60 are disposed on or around the edges of work surface 50 to facilitate the stitching process. Conventional targets 60 are also used as reference targets during bundle adjustment, another conventional stereo photogrammetric process that optimizes the surface profile.

Figure 3:
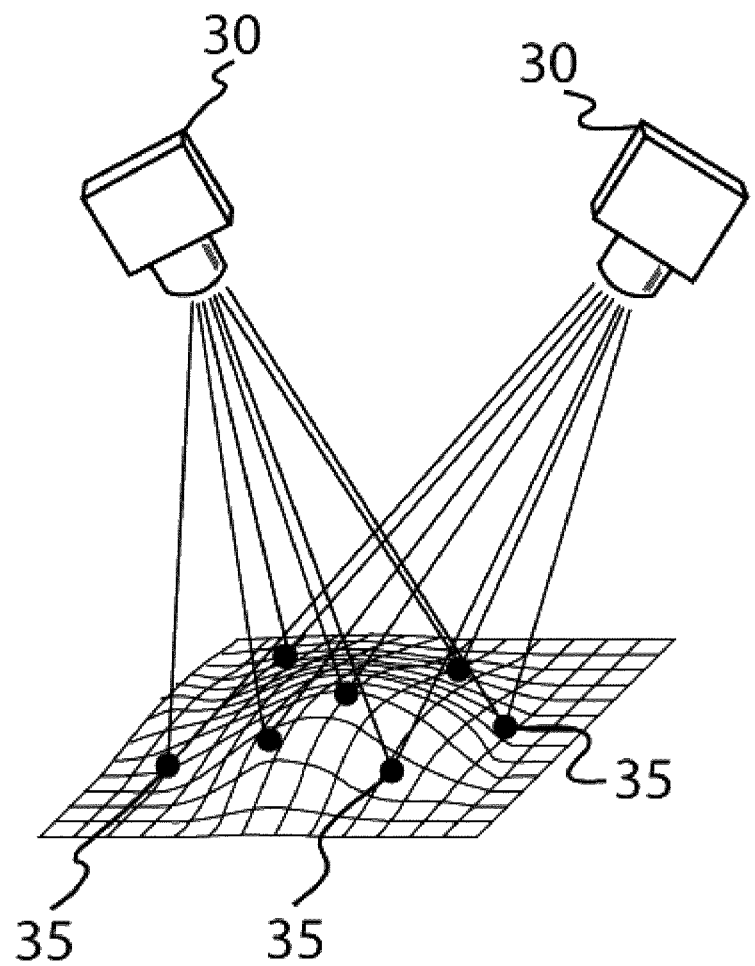
FIG. 3 illustrates prior art stereo photogrammetry.
Figure 4:
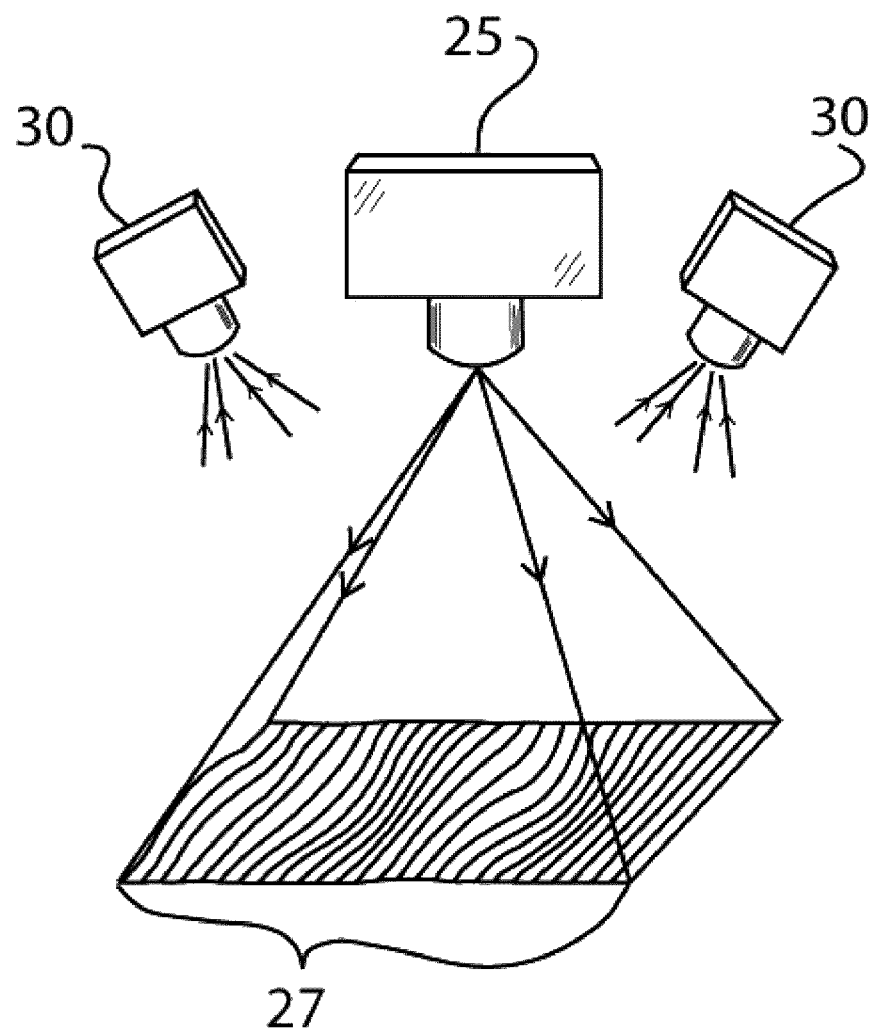
FIG. 4 illustrates prior art structured light photogrammetry.

Cellular core profiling is a subset of the more general field of surface profiling. As illustrated in FIG. 3 and FIG. 4, prior art surface profilers typically comprise either two cameras 30 or one structured light projector 25 and at least one camera 30. In general, 3-D photogrammetry systems operate through a triangulation process in which each measurement point on the work surface is identified in images obtained from at least two (non-redundant) viewpoints, each pair of viewpoints separated by a known baseline. The two apparent angular positions are then combined to estimate the distance from the baseline to the measurement point using well known solid geometry formulae.

Profiling a cellular core presents two major challenges. First, in many instances it is desirable to measure the surface profile at the location of every cell and there may be tens of thousands of cells. Second, there is no continuous surface on which to make measurements; the desired profile is of a surface defined by the ends of the walls of the cells.

The various prior art systems differ primarily in how individual measurement points are identified in the images obtained from the different viewpoints. In the classical stereo-photogrammetry system shown in FIG. 3, individual points are either inherently recognizable in at least one pair of images of the work surface (as is the case in aerial photograph) or, for relatively featureless surfaces, the natural points are supplemented by one or more added targets 35. Such targets may be retroreflectors or, as shown in FIG. 3, added targets 35 may be, for example, small disks adhered to work surface 50.

In a "structured light scanner", two-camera embodiment, as shown in FIG. 4, an unstructured surface is illuminated with a light pattern 27 that is recognizable in each camera. In the illustration, light pattern 27 is a fringe pattern.

The fringe pattern form of a structured light scanner is of particular note. In this form of scanner, a fringe pattern is projected on the work surface. The phase of the fringe pattern is evaluated at each image point, in both cameras. Those image points that appear to have identical phases are taken to be the same physical points. Thus, phase measurement errors can make two different physical points appear to be a single "target" point. Triangulation erroneously using two different physical points results in a surface profile error.

An advantage of the embodiments of the invention is the cell finding process by which each of the tens of thousands of cells in the field of view of the cameras is identified as a "target" for triangulation. Classical stereo-photogrammetry, as has been mentioned, requires recognizably distinct targets, either naturally occurring on the work surface, or added supplemental targets.

A further advantage of the embodiments of the invention is the use of non-linear optimization to determine the locations of the cell junctions, which in turn lead to the calculation of a consistent parameter, for example the areal centroid of the cell, as the definition of the location of the target in the field of view of each camera. Conventional structured light scanners depend on the limited-accuracy processing of the structured light patterns to determine the location of their targets.

Yet another advantage of embodiments of the invention is the separation of the process of generating identification labels for the cells from the process of identifying or finding the location of the cells. More specifically, this advantage is applicable to naturally occurring targets as well as supplemental, applied targets.

Another advantage of embodiments of the invention is the two stage generation of the surface profile. That is, the advantage is using an optimization technique, such as bundle adjustment, on a small subset of targets, and carrying the optimization parameters over to calculating the full surface profile, reducing the processing load thereby.

Figure 5:
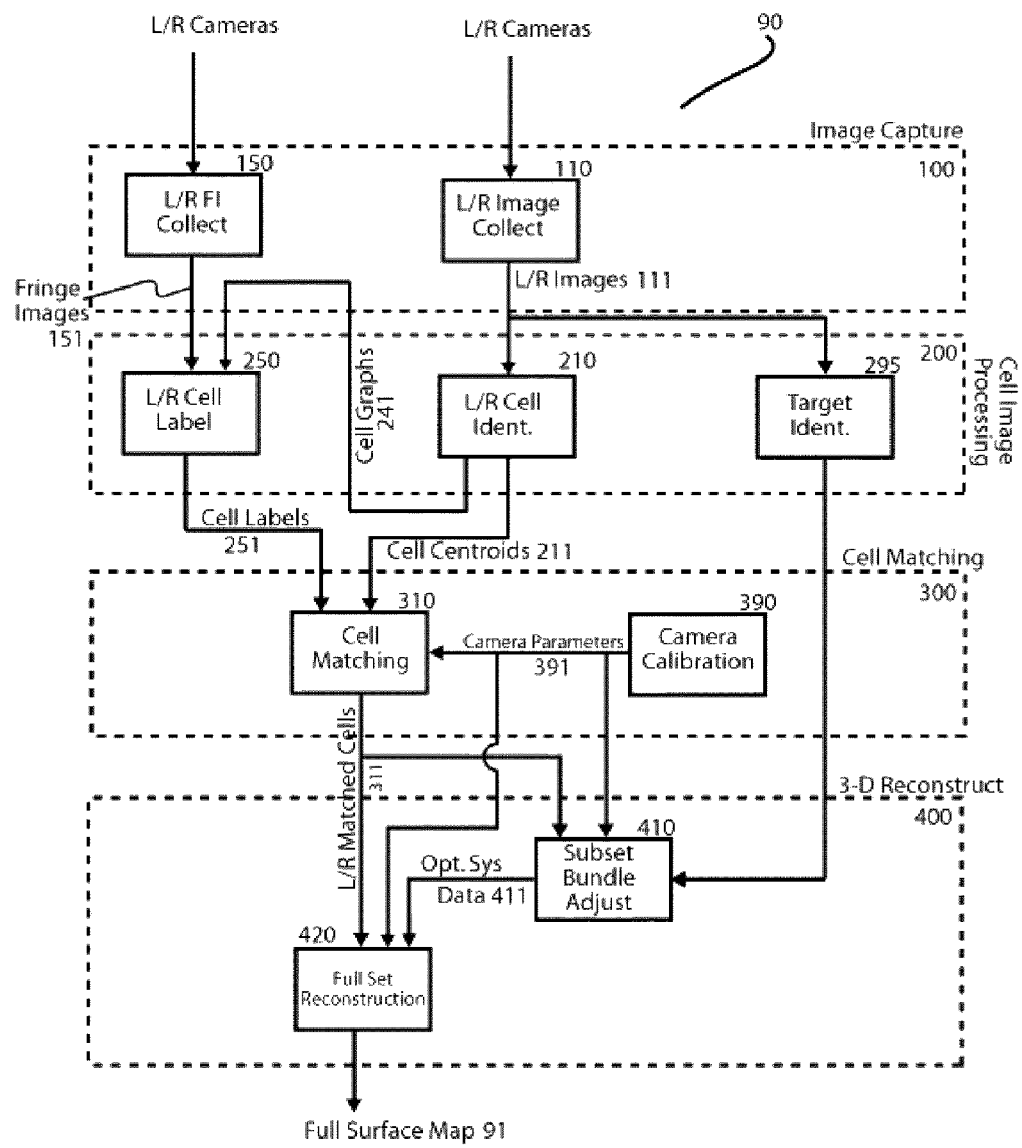
FIG. 5 illustrates the process flow of the cellular core profiling system according to one embodiment of the present invention.

Cellular core profiling systems implemented according to embodiments of the present invention combine data from both classical stereo-photogrammetric images and structured light scanner pattern images, as shown in the Cellular Core Profiling Process Flow 90 illustrated in FIG. 5. The process is initiated with Image Collection, process step 100. Image Collection 100 comprises two substeps; Left/Right Image (L/RI) Collection 110 and Left/Right Fringe Image (L/RFI) Collection 150.

It should be noted that a majority of the process steps comprising the embodiments of the method are applied independently to images from the "left" camera and the "right" camera. As such, for brevity and clarity, the various process steps and data sets referenced herein are prefaced with "L/R" to indicate this parallel processing. However, the absence of such a preface should not be taken to mean that the data set or process step is applicable to only one of the two data sets, except where it would be obvious to one of ordinary skill in the art that the parallel data flow has ended, viz., during the reconstruction of the surface map.

It should be further noted that the terminology "left" and "right" is used herein for convenience and clarity to represent the minimum two non-redundant viewpoints from which images must be collected to perform photogrammetric triangulation; it will be understood that in some embodiments there are a plurality of image capture positions, of which the "left" and "right" positions are just the first and second viewpoints. It will be further understood that for each pair of non-redundant viewpoints the exists a triangulation baseline, that is, a line of known length and direction that connects a known point in the image captured from the first viewpoint to a known point in the image captured from the second viewpoint.

During L/RI Collection 110, work surface 50 is typically illuminated with generally uniform light as it is viewed by imaging cameras 30, where generally uniform illumination is typically illumination that varies by no more than 30% across work surface 50 and which varies by less than 5% over a region approximately equal to a feature of interest, in this embodiment a cellular core cell. Generally uniform illumination is typically used to achieve a substantially constant signal-to-noise ratio and to minimize any post-collection image compensation processing. Alternatively, an equivalent, generally uniform exposure image may be synthesized from a multiplicity of exposures made with non-uniform illumination wherein the multiple images are, for example, averaged to smooth out the non-uniformities in the individual images. The illuminating light can be ambient light but preferably is provided by the system. For example, digital light projector 20 can be programmed to project said generally uniform illumination.

Generally a left and a right image (L/R Images) 111 are captured substantially simultaneously.

L/RFI Collection 150 is preferably performed in close temporal proximity to L/R Image Collection. During L/RFI Collection 150 digital light projector 20 is programmed to operate as a structured light projector 25. In one embodiment the projected intensity has a raised cosine fringe pattern, viz., $I(x) \propto A + B \cos(2\pi x/\lambda + \phi)$, where I is the intensity, x is the spatial coordinate, A and B are constants with $A \geq B$, $\lambda$ is the spatial wavelength of the fringe pattern, and $\phi$ is a phase shift value.

As is well known in the art, L/RFI Collection 150 comprises recording sets of images in each camera to enable accurate estimation of the phase at each image point using, for example, an "N-bin" algorithm. In one embodiment L/RFI Collection 150 comprises collecting 4 images of each of 2 fringe patterns. The 2 fringe patterns comprise a one-fringe-per-image field pattern and a 20 fringe-per-image-field pattern. The 4 images per fringe pattern comprise images in which the phase, $\phi$, of the fringe is incremented by 90-degrees between images. In a typical embodiment there are about 160 cells across the field of any one image. Collectively the output from L/RFI Collection 150 are L/R Fringe Images 151, the fringe images from the one-fringe-per-image field pattern being L/R Fringe Images 151A and the fringe images from the 20 fringe-per-image-field pattern being L/R Fringe Images 151B.

Referring to Process Flow 90 in FIG. 5, after Image Capture 100, the images 111 and 151 are transferred into the Cell Image Processing step 200, comprising a L/R Cell Identification 210 and a L/R Cell Labeling 250 process. The L/R Images 111 are also processed to identify the reference targets 60 in the field of view, step 295, which processing may be done in stereo-photogrammetry. See, for example, Gutierrez, J. A. and Armstrong, B. S. R.

Cell Identification—As indicated, a part of Cell Image Processing 200, L/R Cell Identification 210, is a prerequisite to L/R Cell Labeling 250. Cell identification is the process of finding each thin walled cell in an image containing millions of pixels representing perhaps 20,000 cells. As shown in FIG.

6, the originally multi-valued L/R Images 111 from L/RI Collection 110 are converted to binary images at step 215 by applying, in one embodiment, an adaptive intensity thresholding filter, wherein image pixels above said adaptive threshold are set to 1 ("white"), and those below are set to 0 ("black"). In one embodiment the threshold value is set at 2% above the local background. The resulting binary images comprise generally black cell centers surrounded by white cell walls of non-uniform thickness.

After thresholding, each L/R image is "skeletonized" in step 220. Skeletonization is a well-known process in image processing. A skeleton (or topological skeleton) of a shape is a thin version of that shape that is equidistant to its boundaries. The skeleton usually emphasizes geometrical and topological properties of the shape. In the present invention a skeleton is a good representation of a cell since the thickness of the cell walls do not contribute to the knowledge of the cell's location, which for the purposes of this embodiment of the invention is defined by the centroid of the geometric figure forming the cell. In another embodiment of the invention, for example, the cell's location could be defined by the location of a selected junction. The output of Skeletonization 220 is a Preliminary Cell Graph 221 that will be refined during later steps.

In one embodiment, skeletonization may be performed using the approach described in "Efficient Binary Image Thinning using Neighborhood Maps" by Joseph M. Cychosz. Different skeletonization (or thinning) approaches will typically result in different skeletons, but such differences will not have a substantial effect on L/R Cell Identification, process step 210, after Cell Graph Optimization 235, described below.

The Preliminary Cell Graph 221 that is output from Skeletonization 220 is used to find a set of preliminary cell junctions in the L/R images. Cell junctions are identified in a Find Junction 225 process based on their known property of having M cell walls meeting at the junction, where M is greater than 2. In one embodiment, each white pixel in the field is tested to see if it is a junction. A 3×3 square of pixels is centered on the pixel being tested. The eight pixels surrounding the test pixel are examined and the number of discrete black (or white) regions is determined, where a discrete region is defined as one or more contiguous pixels having the same (black or white) state. A junction is found when there are more than 2 discrete black (or white) regions. The repeated application of this process to all white pixels produces an array of Preliminary Junction Locations 226, said locations to be refined during an Optimize Cell Graph 235 step.

The array of Junction Locations 226 determined in Find Junctions 225 is the basis for creating a L/R Baseline Cell Graph 231 in a Create Cell Graph 230 step. L/R Baseline Cell Graph 231 is created by mathematically defining the lines that connect the Preliminary Junction Locations 226 and which substantially overlay the L/R Preliminary Cell Graph 221.

Preliminary Cell Graph 221 defines the locations of the cells in each L/R image with relatively coarse accuracy. In some applications it is desirable to know the cell locations to approximately 0.2 pixels. Therefore some embodiments include a step of Cell Graph Optimization 235. Cell graph optimization is the process of refining the estimate locations of the cell junctions to make the cell graph better match the true cells, according to some figure of merit. For some embodiments the figure of merit is the square root of the integrated intensity values (in the original L/R images 111) under the cell graph lines, where the intensity value assigned to the line is a bi-linear interpolation at points spaced out by 1 pixel along the line segment.

For small fields, cell optimization can be achieved analytically. However, in most cases of practical interest, a typical L/R image includes approximately 15,000 cells whose locations are defined by the junctions, implying, for hexagonal cells, approximately 90,000 degrees of freedom, requiring a non-analytic solution.

One embodiment comprises a "simulated annealing" optimization technique, such as the one disclosed in Michalewicz. Simulated annealing is a generic probabilistic approach to the global optimization problem of applied mathematics, namely locating a good approximation to the global minimum of a given function in a large search space. It is often used when the elements in the search space are discrete, as it is for optimizing a cell graph, where the elements are the distinct cell junctions. For certain problems, simulated annealing may be more effective than exhaustive enumeration—provided that the goal is merely to find an acceptably good solution in a fixed amount of time, rather than the best possible solution.

In the context of Cell Graph Optimization 235, simulated annealing comprises iteratively replacing the current set of junction locations by a random "nearby" set, chosen with a probability that depends on the difference between the corresponding figure of merit values and on a global parameter T, which is gradually decreased during the process. The dependency is such that the current solution changes almost randomly when T is large, but increasingly towards a minimum as T goes to zero. The allowance for "uphill" moves saves the method from becoming entrapped at local minima.

Figure 6:
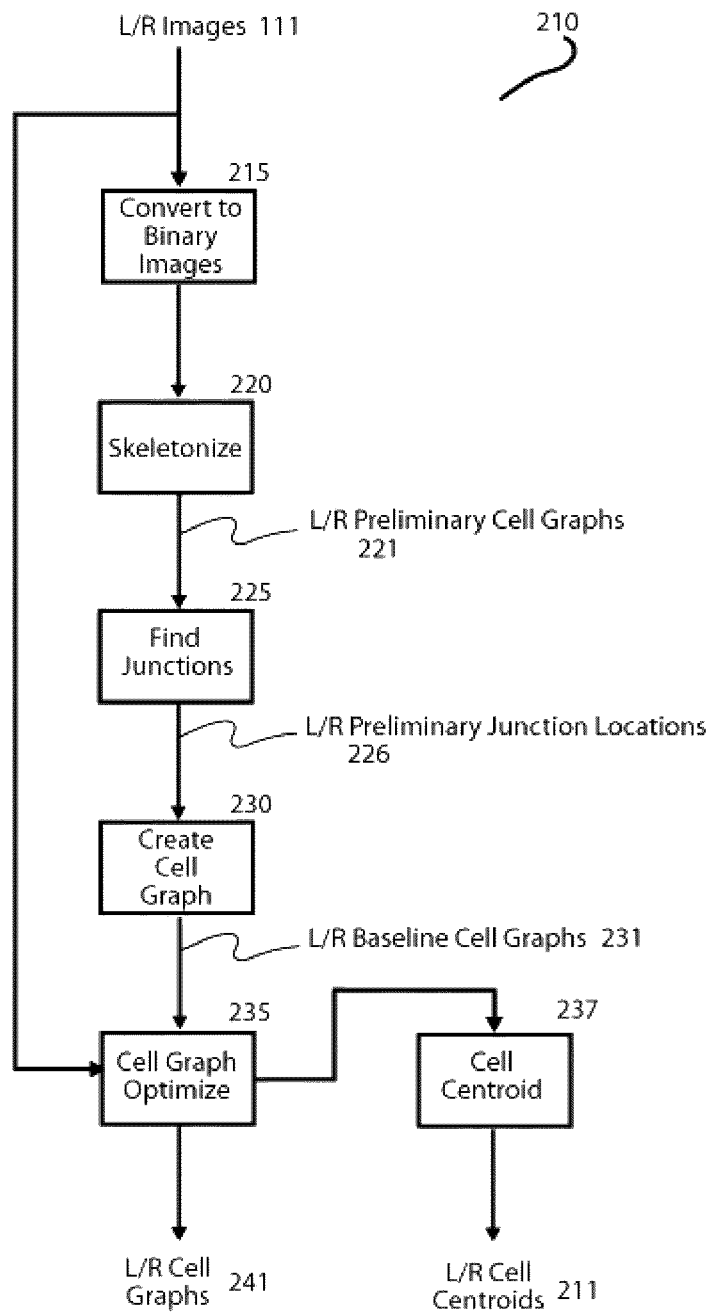
FIG. 6 illustrates the process of finding the cell wall graph and cell center according to one embodiment of the present invention.

In the optimized cell graph representation, the location of each cell is defined by the locations of its surrounding cell junctions; for hex cells there are six times the number of junctions as there are cells. Therefore, it is convenient to develop a single value definition for the location of a cell; one such definition is the geometric centroid of the region defined by the junctions. The centroid calculation occurs in step 237 in the process flow diagram of FIG. 6. The Cell Centroiding 237 operation produces a set of L/R Cell Centroids 211.

Cell Labeling—L/R Fringe Images 151 are used to create phase "labels" for the individual cells that were identified in L/R Cell Identification 210. L/R Cell Labeling 250 comprises estimating a unique "value" for each cell on the work surface, independent of how the cells are imaged. In one embodiment, a structured light projector is used to project a unique "label" directly on the cells in the work surface such that those labels can be read from any vantage point. Conceptually, for example, the structured light projector could literally project unique serial numbers onto the cells in the work surface.

As another example, the structured light projector may illuminate the work surface with a series of spatially varying intensity patterns, which patterns, when processed at each spatial location as a sequence of intensity values, are unique. In general, for each target on the work surface there exists some target area in each image that can be associated with the particular target, where that association can be pre-defined. One or more pixels within this target area can be selected to be target area pixels used to process the structured light patterns. For example, in a cellular core the cell centroids are conveniently selected as the targets. The associated target areas, generally, will be the pixels containing the walls of the cells any one or more of which can be the target area pixels. Generally, to reduce the effects of noise or measurement errors, it is desirable to use all available target area pixels in processing. Note in this example that any given pixel may be part of multiple target areas since a given cell wall is shared by two adjacent cells.

One series of intensity patterns that can be used comprises binary stripes of different spatial frequencies, each spatial frequency being a base frequency to a power of 2. A different series of binary striped patterns that can be employed comprise the so-called Gray code. In one embodiment, as illustrated in FIG. 1 and for which the processing is described below, sinusoidal fringe pattern 27 is used.

Figure 7:
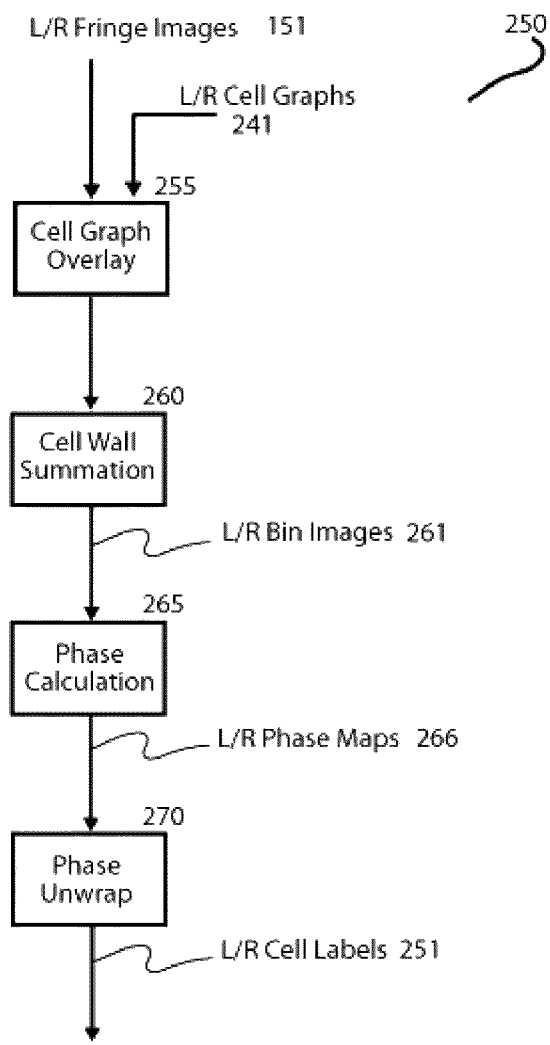
FIG. 7 illustrates the process of estimating a cell's phase according to one embodiment of the present invention.

As shown in FIG. 7, L/R Cell Labeling 250 begins at a Cell Graph Overlay 255 step. Optimized L/R Cell Graph 241 is used as a mask on each L/R Fringe Image 151 to isolate the pixels to be used to develop the phase label for the cells. Preferably only pixels that "touch" the cell graph are used in the process.

L/R Cell Labeling 250 continues with a step of Cell Wall Summation 260. For each individual image in the set of L/R Fringe Images 151 the pixel intensity values around all the cell walls of each cell are summed, wherein only pixels isolated during Cell Graph Overlay 255 are included in the summation. Cell Wall Summation 260 produces a set of L/R Bin Images 261 wherein a single intensity value is associated with each cell in each L/R Fringe Image 151. In one embodiment there are eight sets of L/R Bin Images 261 that are transferred to a Phase Calculation step 265. L/R Bin Images 261 comprise both L/R Bin Images 261A, derived from L/R Fringe Images 151A and L/R Bin Images 261B, derived from L/R Fringe Images 151B.

Phase Calculation step 265 comprises the application of any of several well known phase estimation processes to convert the "N" phase shifted samples of a sinusoidal signal into an estimate of the phase of that sinusoid. See, for example, Horwitz in U.S. Pat. No. 4,575,248, "Wavefront sensor employing novel D.C. shearing interferometer" wherein so-called four-bin processing is applied to a shearing interferometer.

In one embodiment a four sample process, also know as four-bin processing, is used. That is, for signals of the form $S = A + B\sin(\phi + \varphi)$, where $\phi$ is a controllable phase variable, $\varphi$ is the phase being estimated, and S is the measurable signal. If four signals, S1, S2, S3, and S4 are measured with $\phi$ set to 0, 90, 180, and 270 degrees respectively, then it may be readily shown that $$\varphi = \arctan[(S3-S1)/(S4-S2)] + \varphi_0 \quad (1)$$

is an analytically exact formula, where $\varphi_0$ is an arbitrary constant phase shift.

In one embodiment phase estimation in accordance with equation (1) is applied to each cell in L/R Bin Images 261A and independently applied to each cell in L/R Bin Images 261B. Processing L/R Bin Images 261A results in a Phase Map 266A in which the phase varies by substantially $2\pi$ from one edge of the field to the other. Similarly, process L/R Bin Images 261B results in a Phase Map 266B that displays approximately 20 cycles of $2\pi$ across the field, corresponding to the 20 fringes that were used to record L/R Fringe Images 151B. It may be noted that the phase values for corresponding cells in the left and right images will be identical, to within the limits of noise, optical and digital resolution, and detection non-linearities, because the phase is determined by the single set of structured light patterns viewed simultaneous by the left and right cameras.

In a particular application of interest there are approximately 160 cells across the field. The inventor has determined that the single Phase Map 266A, with a single $2\pi$ cycle across the field, may not have adequate resolution or accuracy to properly assign a unique phase label to each cell across the field. Phase Map 266B has adequate accuracy and resolution but has a 20-fold ambiguity arising from the 20 fringes across the field. A Phase Unwrap 270 step is preferably applied to remove the ambiguity.

Generally, Phase Unwrap 270 combines Phase Maps 266A and 266B to use the resolution of Phase Map 266B to determine the detailed information while using the unambiguous range of Phase Map 266A to determine in which of the 20 fringes that detail resides. One suitable approach is a "coarse/fine" unwrap.

The approach proceeds in three steps:
  i. Scale Phase Map 266B to match Phase Map 266A; that is, divide the phase values in Phase Map 266B by 20 (where 20 is the fringe count in Phase Map 266B).
  ii. Subtract the scaled values (scaled Phase Map 266B) from the phase values in Phase Map 266A to get the fractional fringe phase difference. Multiply by 20 to get the coarse integer-fringe phase.
  iii. Generate the unwrapped phase by combining the coarse integer-fringe phase with the fine fringe phases in Phase Map 266B.

The output of Phase Unwrap 270 are two sets (left and right) of generally unique phase values associated with the cells in the L/R images. These values are used as L/R Cell Labels 251 to facilitate finding the matching cells needed for triangulation.

Returning to FIG. 5, the third general step in Cellular Core Profiling Process flow 90 is a L/R Cell Matching 300 process. Matching the cells between the left and right images is a key prerequisite operation to triangulation; by definition the matched cell is the third vertex of the triangle. In prior art systems measurement points are matched by one of two means; either easily identifiable physical targets are placed on work surface 50 or a structured light projector is used to project recognizable "features" onto the otherwise unremarkable work surface. Wherever in the field the left and right cameras perceive these recognizable features to be is where the third vertex for the triangulation equation is assumed to be. Cellular Core Profiling Processes 90 implemented according to embodiments of the present invention accurately place the cells' centroids in the left and right cameras' fields and use the cell labels to ensure that triangulation takes place using only one cell as the vertex in the calculation.

Figure 8:
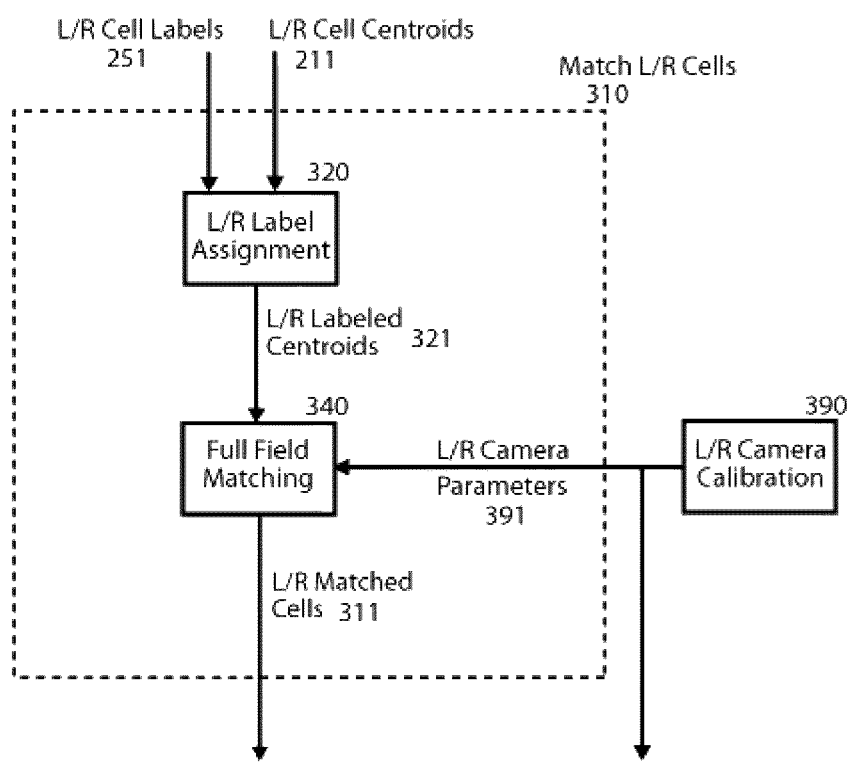
FIG. 8 illustrates the process of matching cells between images according to one embodiment of the present invention.

As shown in FIG. 8, input data for Cell Matching 300 comprise L/R Cell Labels 251 and L/R Cell Centroids 211. Both data sets have the form of a cell's pixel index value (that is, its row and column in the detector array) linked to its parameter value (its centroid in detector co-ordinates or its phase-generated label). This input data is utilized in a L/R Label Assignment 320 step to match or associate the appropriate label to the corresponding centroid value. The association is easy to achieve since both data are derived from one camera. The associations is made using the cell's pixel index value. The resulting output L/R Labeled Centroids 321 is a map that provides a high resolution, camera-centric centoid for each cell and gives each cell a label for easy identification.

It will be obvious to one of skill in the art that use of the cell centroids as the target point is a convenient but not necessary choice. For example, for each cell a particular junction could be designated at the target point, in which case the cell walls would still be the target area from which pixels were selected for structured light processing.

Full Field Matching 340 is the second step in Cell Matching 300. In some embodiments, the L/R Fringe Images 151 comprise only "X-fringes", so, correspondingly, L/R Cell Labels 251 provide only one-dimensional cell identification. Full Field Matching 340 is completed in these embodiments by matching Y-coordinates with the epipolar line, an established concept from stereo photogrammetry.

Projection of the epipolar line requires that the two cameras be fully calibrated. Camera Parameters 391, which are typically used in conventional stereo-photogrammetry, provide the information needed, for example, to correct camera distortion and magnification errors, and includes information relating to camera pointing direction. Using basic knowledge of the system's epipolar geometry, as is well known in the photogrammetry art, the epipolar points for the image planes in the right and left cameras, EPR and EPL respectively, are established.

In general, cell matching comprises, first, selecting a target cell C1 from one of L/R Labeled Centroids 321, say the cell centroid labeled C1L, from the left camera. Cell matching further comprises determining the epipolar plane, which is the plane containing C1, EPL, and EPR. The epipolar line in the image plane of the right camera is the line that is contained in the epipolar plane and passes through EPR and C1R. Thus, the last step in cell matching is following the epipolar line in the image plane of the right camera from EPR until the cell with the label C1R is reached. In embodiments described herein the L/R Cell Labels 251 are really the phases calculated from the structured light measurements.

In order to completely match the cells the epipolar calculation is repeated for each cell.

As was mentioned above, Full Field Matching 340 requires accurate knowledge of the Camera Parameters 391. In one embodiment these calibrations are obtained using an artifact on which a number of calibration targets are installed, in one embodiment, 60 targets. The targets may be on posts with random z heights.

Camera Parameters 391 are obtained by repeatedly measuring the artifact in a Camera Calibration step 390. In one embodiment, for example, the artifact is measured 10 times, at different angles and rotations, using standard stereo photogrammetry. Combining the multiple measurements, again using standard bundle adjustment techniques, provides accurate estimates of, for example, lens distortions, focal lengths, and principal points. One additional measurement of the artifact is obtained and the bundle adjustment technique is applied to optimize the estimate of the relative positions of the two cameras.

Figure 9:
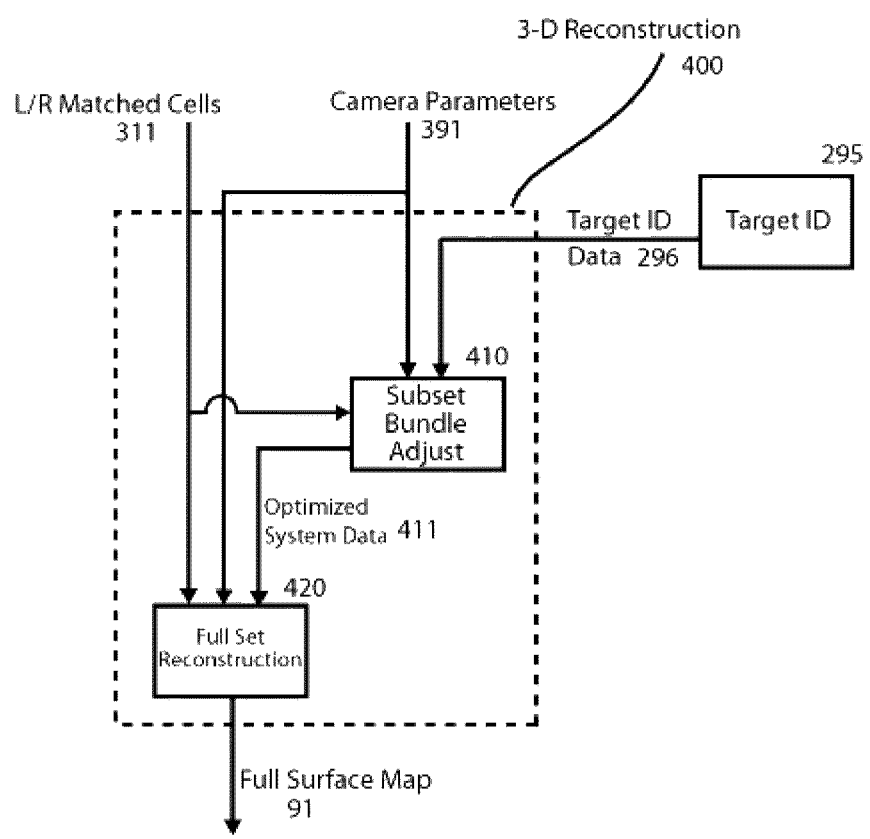
FIG. 9 illustrates the process of generating the surface profile according to one embodiment of the present invention.

The fully matched cells, L/R Matched Cells 311, are transformed in a single surface profile during a Three-Dimensional Reconstruction 400 step, shown in FIG. 9. In some embodiments the L/R Matched Cells 311 can be processed directly using one of the reconstruction techniques known in the stereo-photogrammetric art. Typically the reconstruction technique includes the parameter optimization step known as bundle adjustment. In other embodiments, particularly those applied to fields with many cells, reconstruction is performed in two stages, a Subset Bundle Adjust 410 and a Full Set Reconstruction 420.

As illustrated in FIG. 9, Subset Bundle Adjust 410 combines L/R Matched Cells 311 with the camera calibration data, L/R Camera Parameters 391 and the traditional photogrammetry target data, Target ID 296, which were generated for the calibration step. Subset Bundle Adjust 410 is an optional step used to reduce the system processing load below that which would be required to bundle adjust the very large number of target points in particular work surfaces of interest. In one embodiment, a subset of L/R Matched Cells 311 is selected for processing using conventional bundle adjustment techniques well known in the photogrammetry art. In one embodiment approximately 400 to 500 cells, randomly but uniformly distributed over the field, are selected. Subset Bundle Adjust 410 is the conventional optimized generation of the surface map of the less densely sampled work surface.

The output of any bundle adjustment is a "best fit" surface map and a corresponding "best fit" camera parameter set. These Optimized System Data 411 sets are combined in a Full Set Reconstruction 420 step. In this step conventional photogrammetric processing is used to generate the Full Surface Map 91 (containing, in one embodiment 15,000 to 20,000 cells) without utilizing the processing intensive bundle adjustment procedure.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Elements and components described herein may be further divided into additional components or joined together to form fewer components for performing the same functions.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What we claim as our invention is:

1. A method for determining a profile of a work surface, the method comprising:
   (A) capturing, using at least one image capture device, first and second pluralities of images of the work surface, comprising capturing the first plurality from a first viewpoint and capturing the second plurality from a second viewpoint which differs from the first viewpoint, said first and second pluralities of images lying in a plurality of planes, wherein the work surface comprises a cellular core, wherein the cellular core comprises a plurality of cells having a plurality of walls with a plurality of ends;
   (B) producing, from the first and second pluralities of images, a representation of a three-dimensional locus of points defining a virtual continuous surface fitted to the plurality of ends of the plurality of walls of the cellular core, comprising:
     (B)(1) finding, based on the first and second pluralities of images, first and second pluralities of junctions of the plurality of cells in the first and second pluralities of images;
     (B)(2) calculating, based on the first and second pluralities of junctions, a first and second plurality of locations in the first and second plurality of planes of the pluralities of images of a first and second plurality of centroids of the plurality of cells in the first and second plurality of images; and
     (B)(3) triangulating a plurality of three-dimensional coordinates based on the first and second plurality of locations of the first and second plurality of centroids in the first and second plurality of images and a plurality of baselines.

2. The method of claim 1, wherein (A) comprises:
   (A)(1) capturing a plurality of structured light images, comprising capturing at least one image in the first plurality and at least one image in the second plurality using structured light.

3. The method of claim 2, wherein (B) further comprises:
   (B)(4) after (B)(2) and before (B)(3), associating the plurality of centroids with a plurality of labels based on the plurality of structured light images;
   wherein (B)(3) comprises triangulating the plurality of three-dimensional coordinates using the plurality of labels to select centroids of identical cells in the first and second pluralities of images.

4. The method of claim 2, wherein (A) comprises capturing the first and second pluralities of images using at least one first camera, and wherein (C) comprises capturing the plurality of structured light images using the at least one first camera.

5. The method of claim 2, wherein (C) comprises:
   (C)(1) projecting a structured light pattern onto the work surface; and
   (C)(2) capturing the plurality of structured light images while the structured light pattern is projected onto the work surface.

6. The method of claim 1, wherein (A) comprises:
   (A)(1) generating a particular image in the first plurality of images with a generally uniform exposure across the work surface, comprising:
     (A)(1)(a) applying generally uniform illumination to the work surface; and
     (A)(1)(b) capturing the particular image while the work surface is illuminated.

7. The method of claim 1, wherein (A) comprises:
   (A)(1) generating a particular image in the first plurality of images with a generally uniform exposure across the work surface, comprising:
     (A)(1)(a) capturing a plurality of structured light images of the work surface using structured light, said plurality of structured light images lying in one plane; and
     (A)(1)(b) synthesizing the particular image from the plurality of structured light images.

8. The method of claim 1, wherein capturing the first and second pluralities of images of the work surface using at least one image capture device comprises capturing the first and second plurality of images using a single image capture device.

9. The method of claim 1, wherein capturing the first and second pluralities of images of the work surface using at least one image capture device comprises capturing the first and second plurality of images using a plurality of image capture devices, wherein the plurality of image capture devices includes the at least one image capture device.

10. The method of claim 9, wherein the first and second plurality of images comprise at least a first image and a second image, and wherein (A) comprises capturing the first image using a first camera and capturing the second image using a second camera.

11. An apparatus for determining a profile of a work surface, the work surface comprising a cellular core, the cellular core comprising a plurality of cells having a plurality of walls with a plurality of ends, the apparatus comprising:
   image capture means for capturing first and second pluralities of images of a work surface, comprising viewpoint capture means for capturing the first plurality from a first viewpoint and for capturing the second plurality from a second viewpoint which differs from the first viewpoint, said first and second pluralities of images lying in a plurality of planes;
   virtual surface production means for producing, from the first and second pluralities of images, a representation of a three-dimensional locus of points defining a virtual continuous surface fitted to the plurality of ends of the plurality of walls of the cellular core, comprising:
   junction finding means for finding, based on the first and second pluralities of images, first and second pluralities of junctions of the plurality of cells in the first and second pluralities of images;
   location calculation means for calculating, based on the first and second pluralities of junctions, a first and second plurality of locations in the first and second plurality of planes of the pluralities of images of a first and second plurality of centroids of the plurality of cells in the first and second plurality of images; and
   triangulation means for triangulating a plurality of three-dimensional coordinates based on the first and second plurality of locations of the first and second plurality of centroids in the first and second plurality of images and a plurality of baselines.

* * * * *

UNITED STATES PATENT AND TRADEMARK OFFICE
CERTIFICATE OF CORRECTION

Page 1 of 1

PATENT NO. : 8,582,824 B2
APPLICATION NO. : 12/491669
DATED : November 12, 2013
INVENTOR(S) : Jason Remillard It is certified that error appears in the above-identified patent and that said Letters Patent is hereby corrected as shown below:

On the title page, item (56), under "Other Publications", in column 2, line 26, delete "Segmantation" and insert -- Segmentation --, therefor.

In the Specification

In column 9, line 36, delete "know" and insert -- known --, therefor.

In column 9, line 38, delete "ϕ" and insert -- φ --, therefor.

In column 9, line 38, delete "ϕ" and insert -- φ --, therefor.

In column 9, line 44, delete "ϕ" and insert -- φ --, therefor.

In column 9, line 44, delete "ϕ0" and insert -- φ0 --, therefor.

In column 9, line 45, delete "ϕ0" and insert -- φ0 --, therefor.

In column 10, line 55, delete "centoid" and insert -- centroid --, therefor.

Signed and Sealed this
Thirteenth Day of May, 2014

Michelle K. Lee
*Deputy Director of the United States Patent and Trademark Office*